(12) United States Patent
Wang et al.

(10) Patent No.: US 12,505,546 B2
(45) Date of Patent: Dec. 23, 2025

(54) METHOD FOR EVALUATING DWI-FLAIR MISMATCH, APPARATUS, MEDIUM, AND PRODUCT

(71) Applicants: Beijing Tiantan Hospital, Capital Medical University, Beijing (CN); BEIHANG UNIVERSITY, Beijing (CN)

(72) Inventors: Yongjun Wang, Beijing (CN); Jing Jing, Beijing (CN); Tao Liu, Beijing (CN); Yu Zhou, Beijing (CN); Ziyang Liu, Beijing (CN); Zixiao Li, Beijing (CN); Hong Xu, Beijing (CN); Zhe Zhang, Beijing (CN); Hao Liu, Beijing (CN); Xia Meng, Beijing (CN); Yong Jiang, Beijing (CN)

(73) Assignees: Beijing Tiantan Hospital, Capital Medical University, Beijing (CN); BEIHANG UNIVERSITY, Beijing (CN)

( * ) Notice: Subject to any disclaimer, the term of this patent is extended or adjusted under 35 U.S.C. 154(b) by 79 days.

(21) Appl. No.: 19/010,586

(22) Filed: Jan. 6, 2025

(65) Prior Publication Data

US 2025/0299327 A1 Sep. 25, 2025

(30) Foreign Application Priority Data

Mar. 22, 2024 (CN) .......................... 202410329867.5

(51) Int. Cl.
*G06T 7/00* (2017.01)
*G06T 3/02* (2024.01)
(Continued)

(52) U.S. Cl.
CPC .............. *G06T 7/0012* (2013.01); *G06T 3/02* (2024.01); *G06T 5/20* (2013.01); *G06T 7/10* (2017.01);
(Continued)

(58) Field of Classification Search
CPC . G06T 2207/10088; G06T 2207/20081; G06T 2207/30016; G06T 2207/20084;
(Continued)

(56) References Cited

U.S. PATENT DOCUMENTS

2018/0271373 A1* 9/2018 Kim .......................... A61B 5/00
2020/0381096 A1* 12/2020 Zaharchuk ........... G06V 10/776

OTHER PUBLICATIONS

Johansen, J.; Offersen, C.M.; Carlsen, J.F.; Ingala, S.; Hansen, A.E.; Nielsen, M.B.; Darkner, S.; Pai, A. An Automatic DWI/FLAIR Mismatch Assessment of Stroke Patients. Diagnostics 2024, 14, 69. https://doi.org/10.3390/diagnostics14010069 (Year: 2023).*

(Continued)

*Primary Examiner* — Courtney Joan Nelson

(57) ABSTRACT

This application relates to the technical field of image recognition, and provides a method for evaluating a diffusion weighted imaging (DWI)-fluid attenuated inversion recovery (FLAIR) mismatch, an apparatus, a medium, and a product. The method includes: obtaining a DWI image and a FLAIR image of a target object; applying a first image segmentation model to segment the DWI image to obtain a first image segmentation result; applying a second image segmentation model to segment the FLAIR image to obtain a second image segmentation result; registering the second image segmentation result onto the first image segmentation result to obtain a registered second image segmentation result; and applying a Dice metric to evaluate a degree of mismatch between the first image segmentation result and the registered second image segmentation result. This appli- (Continued)

cation can improve efficiency of determining whether DWI and FLAIR are matched.

12 Claims, 6 Drawing Sheets

(51) Int. Cl.
  *G06T 5/20* (2006.01)
  *G06T 7/10* (2017.01)
  *G06T 7/30* (2017.01)
  *G06V 10/25* (2022.01)
  *G16H 30/40* (2018.01)
(52) U.S. Cl.
  CPC ............... *G06T 7/30* (2017.01); *G06V 10/25* (2022.01); *G16H 30/40* (2018.01); *G06T 2207/20084* (2013.01); *G06T 2207/30096* (2013.01)
(58) Field of Classification Search
  CPC ......... G06T 7/0012; G06T 7/11; G06T 7/174; G06T 2207/30004; G06T 2207/30096; G06T 5/00; G06T 2200/04; G06T 2207/30168; G06T 2207/20104; G06T 2210/41; G06T 7/12; G06T 2211/441; G06T 7/00; G06T 7/10; G06T 7/30; G06T 3/02; G06T 5/20; A61B 5/055; A61B 5/0042; A61B 2576/026; A61B 5/7267; A61B 5/7264; A61B 5/4064; A61B 8/0808; A61B 8/5261; A61B 6/501; A61B 2034/105; A61B 90/361; A61B 2576/00; A61B 1/000096; A61B 5/4076; A61B 6/463; G16H 30/40; G16H 50/20; G16H 30/20; G06N 3/0464; G06N 20/00; G06N 3/045; G06N 3/08; G06V 10/82; G06V 2201/03; G06V 2201/031; G06V 10/25

See application file for complete search history.

(56) References Cited

OTHER PUBLICATIONS

Kim, Beom Joon, et al. "Predicting DWI-FLAIR mismatch on NCCT: the role of artificial intelligence in hyperacute decision making." Frontiers in Neurology 14 (2023): 1201223 (Year: 2023).*

Thomalla et al: "DWI-FLAIR mismatch for the identification of patients with acute ischaemic stroke within 4.5 h of symptom onset (PRE-FLAIR): a multicenter observational study", Lancet Neurology, vol. 10, p. 978-986, 2011.

Thomalla et al: "A multicenter, randomized, double-blind, placebo-controlled trial to test efficacy and safety of magnetic resonance imaging-based thrombolysis in wake-up stroke (Wake-Up)", International Journal of Stroke, vol. 9, p. 829-836, 2014-08.

CNIPA, Office Action, Application No. 202410329867.5, May 8, 2024.

* cited by examiner

METHOD FOR EVALUATING DWI-FLAIR MISMATCH, APPARATUS, MEDIUM, AND PRODUCT

CROSS REFERENCE TO RELATED APPLICATION

This patent application claims the benefit and priority of Chinese Patent Application No. 2024103298675, filed with the China National Intellectual Property Administration on Mar. 22, 2024, the disclosure of which is incorporated by reference herein in its entirety as part of the present application.

TECHNICAL FIELD

The present disclosure relates to the technical field of image recognition, and in particular, to a method for evaluating a diffusion weighted imaging (DWI)-fluid attenuated inversion recovery (FLAIR) mismatch, an apparatus, a medium, and a product.

BACKGROUND

Acute ischemic stroke (AIS) is a type of common cerebrovascular disease, with wake-up stroke accounting for approximately 20%. If patients with asymptomatic stroke and patients with known onset time greater than 6 hours are included, a proportion of patients who lose an opportunity for reperfusion treatment due to exceeding a time window is higher. A "mismatch" is an imaging concept introduced based on pathophysiological mechanisms of an ischemic penumbra and an infarct core. The use of a neuroimaging technique to evaluate the infarct core, the ischemic penumbra, and a resulting mismatch volume is expected to provide more guidance for intravenous thrombolysis and endovascular treatment (EVT) of the AIS.

The cytotoxic edema caused by acute cerebral infarct can reduce free diffusion of water, resulting in a decrease in an apparent diffusion coefficient and an increase in a diffusion weighted imaging (DWI) signal. DWI can early display a size and a location of an ischemic lesion, while a fluid attenuated inversion recovery (FLAIR) positivity rate gradually increases with prolongation of a time interval from an onset to magnetic resonance imaging (MRI) examination. Therefore, a patient with positive DWI but negative FLAIR is likely to be within a safe and effective time window for thrombolytic treatment. The WAKE-UP (Efficiency and Safety of MRI-Based Thrombolysis in Wake-Up Stroke) study further confirmed effectiveness of intravenous thrombolysis treatment guided based on a DWI-FLAIR mismatch in AIS patients with unknown onset time. For an AIS patient without an obvious signal indicating high FLAIR, relative signal intensity of the FLAIR in a DWI lesion is high, which is associated with reduced efficacy of the intravenous thrombolysis treatment. This is consistent with a negative correlation between a treatment effect and stroke onset time. In addition, based on the studies in the references [1] Thomalla G. Fiebach J B, Østergaard L, et al. A multicenter, randomized, double-blind, placebo-controlled trial to test efficacy and safety of magnetic resonance imaging-based thrombolysis in wake-up stroke (WAKE-UP)[J]. International Journal of Stroke, 2014,9(6):829-836, and [2] Thomalla G, Cheng B, Ebinger M, et al. DWI-FLAIR mismatch for the identification of patients with acute ischaemic stroke within 4.5 h of symptom onset (PRE-FLAIR): a multicentre observational study [J]. The Lancet Neurology, 2011,10(11):978-986, it is feasible to select the thrombolytic treatment for wake-up stroke patients or stroke patients with unknown onset time based on an improved DWI-FLAIR mismatch (which is defined as that there is a DWI lesion but no corresponding signal change in a FLAIR sequence, or a FLAIR lesion is significantly smaller than a DWI lesion). For a left ventricular outflow (LVO) induced ASI patient receiving the EVT, the DWI-FLAIR mismatch is also associated with a better outcome and less symptomatic intracranial hemorrhage. Although the DWI-FLAIR mismatch is not a mismatch based on a tissue window, such a mismatch generated by different onset time based on different sequential imaging provides theoretical support for treatment of the wake-up stroke.

Currently, whether the DWI and the FLAIR are matched is usually determined by comparing DWI and FLAIR images. The DWI image typically displays an area with high signal intensity due to its sensitivity to water molecule diffusion, while the FLAIR image is used to suppress a cerebrospinal fluid signal and typically displays an area with low signal intensity. Therefore, the DWI image and the FLAIR image are complementary. However, it is time-consuming and effortful to analyze and interpret medical images, resulting in lower efficiency in evaluating whether the DWI and the FLAIR are matched.

SUMMARY

An objective of the present disclosure is to provide a method for evaluating a DWI-FLAIR mismatch, an apparatus, a medium, and a product, which can improve efficiency of evaluating whether DWI and FLAIR are matched.

To achieve the above objective, the present disclosure provides the following technical solutions.

A Method for Evaluating a DWI-FLAIR Mismatch Includes:
  obtaining a DWI image and a FLAIR image of a target object;
  applying a first image segmentation model to segment the DWI image to obtain a first image segmentation result, where the first image segmentation model is obtained by training a neural network based on a U-Net framework by using a DWI image dataset of an acute ischemic lesion;
  applying a second image segmentation model to segment the FLAIR image to obtain a second image segmentation result, where the second image segmentation model is obtained by training the neural network based on the U-Net framework by using a FLAIR image dataset of the acute ischemic lesion;
  registering the second image segmentation result onto the first image segmentation result to obtain a registered second image segmentation result; and
  applying a Dice metric to evaluate a degree of mismatch between the first image segmentation result and the registered second image segmentation result.

Optionally, the neural network based on the U-Net framework includes four sequentially-connected downsampling layers, a residual module, four sequentially-connected upsampling layers, and a first activation function; and
  the four sequentially-connected downsampling layers are connected to the residual module, the residual module is connected to the four sequentially-connected upsampling layers, and the four sequentially-connected upsampling layers are connected to the first activation function.

Optionally, the downsampling layer includes a maximum pooling layer, a first convolutional layer, a first InstanceNorm layer, a second activation function, a second convolutional layer, a second InstanceNorm layer, and a third activation function that are sequentially connected; and sizes of convolution kernels of both the first convolutional layer and the second convolutional layer are 3.

Optionally, the upsampling layer includes a deconvolutional layer, a third convolutional layer, a third InstanceNorm layer, a third activation function, a fourth convolutional layer, a fourth InstanceNorm layer, and a fourth activation function that are sequentially connected; and sizes of convolution kernels of both the third convolutional layer and the fourth convolutional layer are 3.

Optionally, a process of constructing the DWI image dataset of the acute ischemic lesion specifically includes:

obtaining an original DWI image of the acute ischemic lesion;

removing abnormal data from the original DWI image to obtain a processed original DWI image; and labeling a target area in the processed original DWI image to obtain a labeled original DWI image, and using the original DWI image and the labeled original DWI image as the DWI image dataset of the acute ischemic lesion.

Optionally, a process of constructing the FLAIR image dataset of the acute ischemic lesion specifically includes:

obtaining an original FLAIR image of the acute ischemic lesion;

removing abnormal data from the original FLAIR image to obtain a processed original FLAIR image; and labeling a target area in the processed original FLAIR image to obtain a labeled original FLAIR image, and using the original FLAIR image and the labeled original FLAIR image as the FLAIR image dataset of the acute ischemic lesion.

Optionally, the registering the second image segmentation result onto the first image segmentation result to obtain a registered second image segmentation result specifically includes:

registering the FLAIR image onto the DWI image to obtain an affine transformation matrix; and applying the affine transformation matrix to register the second image segmentation result onto the first image segmentation result.

A computer apparatus includes a memory, a processor, and a computer program stored in the memory and executable on the processor, where the processor executes the computer program to implement steps of the method for evaluating a DWI-FLAIR mismatch according to any one of the above items.

A computer-readable storage medium stores a computer program, where the computer program is executed by a processor to implement steps of the method for evaluating a DWI-FLAIR mismatch according to any one of the above items.

A computer program product includes a computer program, where the computer program is executed by a processor to implement steps of the method for evaluating a DWI-FLAIR mismatch according to any one of the above items.

According to specific embodiments provided in the present disclosure, the present disclosure achieves the following technical effects:

The present disclosure applies a first image segmentation model to segment a DWI image of a target object to obtain a first image segmentation result, and applies a second image segmentation model to segment a FLAIR image of the target object to obtain a second image segmentation result, such that target areas displayed on DWI and FLAIR images for a patient can be automatically identified and quickly segmented. Then, the present disclosure registers the second image segmentation result onto the first image segmentation result to obtain a registered second image segmentation result. Finally, the present disclosure applies a Dice metric to evaluate a degree of mismatch between the first image segmentation result and the registered second image segmentation result, achieving automatic evaluation on whether DWI and FLAIR are matched, and improving efficiency of evaluating whether the DWI and the FLAIR are matched.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method for evaluating a DWI-FLAIR mismatch, an apparatus, a medium, and a product, which can improve efficiency of evaluating whether DWI and FLAIR are matched.

The present disclosure provides a DWI-FLAIR mismatch evaluation model based on a deep learning model, which can automatically identify target areas displayed on DWI and FLAIR images for a patient and quickly perform segmentation. Then, through a mismatch evaluation module designed by the present disclosure, a score of a degree of mismatch between the current target areas is obtained.

The present disclosure utilizes a capability of a deep model to achieve image recognition of an acute ischemic lesion in the DWI and FLAIR images, and uses a designed lesion mismatch evaluation algorithm to calculate a score for describing a degree of mismatch between acute ischemic lesions in the DWI and FLAIR images.

A process is briefly described as follows: (1) A DWI dataset of the acute ischemic lesion is used to train a DWI-UNet segmentation network constructed in the present disclosure to obtain a DWI image segmentation model. (2) A FLAIR dataset of the acute ischemic lesion is used to train a FLAIR-UNet segmentation network constructed in the present disclosure to obtain a FLAIR image segmentation model. (3) For a pair of DWI and FLAIR images, an FMRIB software library (FSL) tool is used to register the FLAIR image onto the DWI image to obtain an affine transformation matrix. (4) The DWI image segmentation model and the FLAIR segmentation model are respectively used to segment the images to obtain two image segmentation results. (5) The two obtained segmentation results are registered by using the affine transformation matrix. (6) Dice indexes of two registered segmentation results are calculated, and a degree of mismatch is obtained based on a value of 1-Dice and converted into a score.

In order to make the above objective, features, and advantages of the present disclosure clearer and more comprehensible, the present disclosure will be further described in detail below in combination with accompanying drawings and specific implementations.

Embodiment 1

Figure 5:
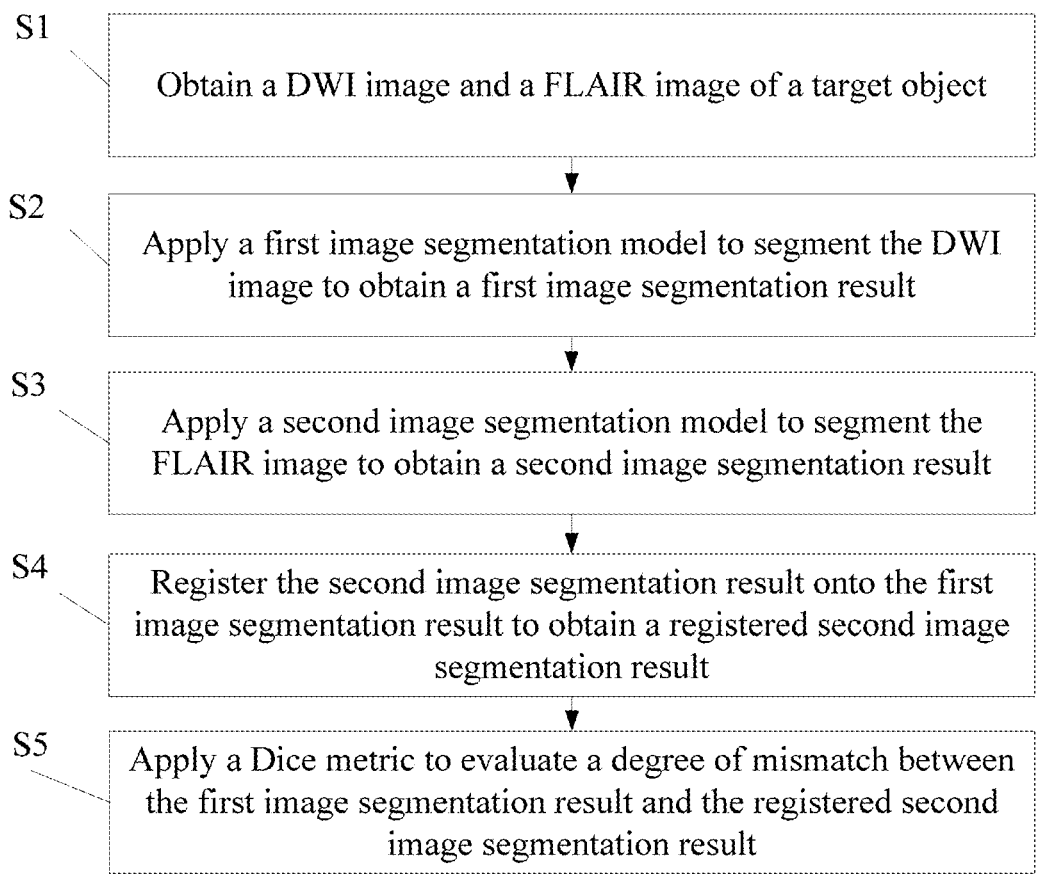
FIG. 5 is a schematic flowchart of a method for evaluating a DWI-FLAIR mismatch according to Embodiment 1 of the present disclosure.

As shown in FIG. 5, a method for evaluating a DWI-FLAIR mismatch in this embodiment includes the following steps:

Step S1: Obtain a DWI image and a FLAIR image of a target object.

Step S2: Apply a first image segmentation model to segment the DWI image to obtain a first image segmentation result, where the first image segmentation model is obtained by training a neural network based on a U-Net framework by using a DWI image dataset of an acute ischemic lesion.

The neural network based on the U-Net framework includes four sequentially-connected downsampling layers, a residual module, four sequentially-connected upsampling layers, and a first activation function.

The four sequentially-connected downsampling layers are connected to the residual module, the residual module is connected to the four sequentially-connected upsampling layers, and the four sequentially-connected upsampling layers are connected to the first activation function.

Specifically, the downsampling layer includes a maximum pooling layer, a first convolutional layer, a first InstanceNorm layer, a second activation function, a second convolutional layer, a second InstanceNorm layer, and a third activation function that are sequentially connected. Sizes of convolution kernels of both the first convolutional layer and the second convolutional layer are 3.

The upsampling layer includes a deconvolutional layer, a third convolutional layer, a third InstanceNorm layer, a third activation function, a fourth convolutional layer, a fourth InstanceNorm layer, and a fourth activation function that are sequentially connected. Sizes of convolution kernels of both the third convolutional layer and the fourth convolutional layer are 3.

Further, a process of constructing the DWI image dataset of the acute ischemic lesion specifically includes the following steps:

Step 11: Obtain an original DWI image of the acute ischemic lesion.

Step 12: Remove abnormal data from the original DWI image to obtain a processed original DWI image.

Step 13: Label a target area in the processed original DWI image to obtain a labeled original DWI image, and use the original DWI image and the labeled original DWI image as the DWI image dataset of the acute ischemic lesion.

Step S3: Apply a second image segmentation model to segment the FLAIR image to obtain a second image segmentation result, where the second image segmentation model is obtained by training the neural network based on the U-Net framework by using a FLAIR image dataset of the acute ischemic lesion.

A process of constructing the FLAIR image dataset of the acute ischemic lesion specifically includes:

Step 21: Obtain an original FLAIR image of the acute ischemic lesion.

Step 22: Remove abnormal data from the original FLAIR image to obtain a processed original FLAIR image.

Step 23: Label a target area in the processed original FLAIR image to obtain a labeled original FLAIR image, and use the original FLAIR image and the labeled original FLAIR image as the FLAIR image dataset of the acute ischemic lesion.

In a practical application, the two image segmentation models used in the present disclosure are: 1) a DWI UNet image segmentation model (namely, the first image segmentation model); and 2) a FLAIR UNet image segmentation model (namely, the second image segmentation model), which are both obtained through training by using an improved UNet-based network.

Figure 1:
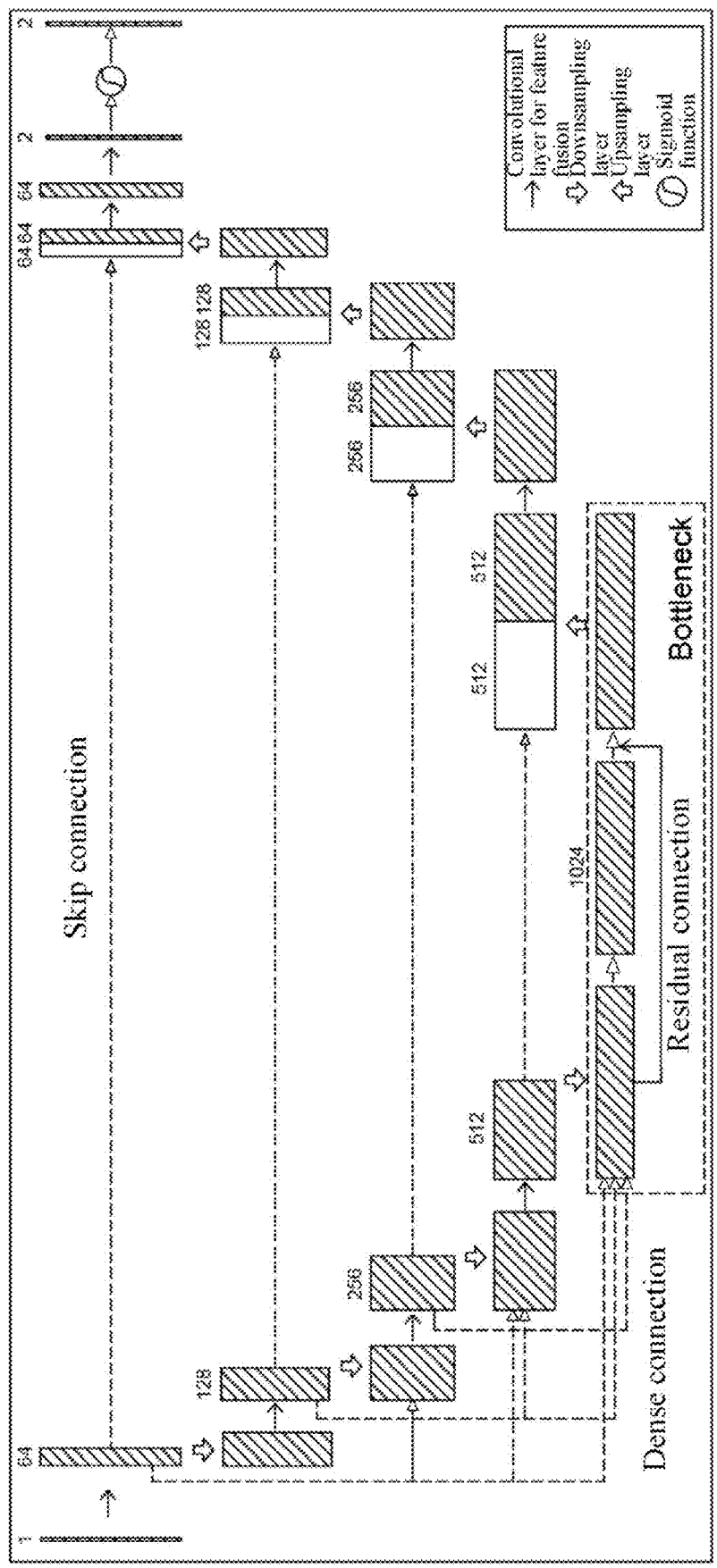
FIG. 1 is a schematic diagram of an architecture of an image segmentation model according to Embodiment 1 of the present disclosure.

Architectures of the two image segmentation models constructed in the present disclosure are consistent, as shown in FIG. 1. Based on a traditional U-Net framework, an image segmentation network in the present disclosure mainly consists of four downsampling and upsampling stages. Each downsampling layer includes a maximum pooling layer, two convolutional layers (with a convolution kernel size of 3, a step of 1, and a padding of 1), two InstanceNorm layers, and two ReLU activation functions, and is constructed in an order of the maximum pooling layer, convolutional layer-1, InstanceNorm-1, ReLU-1, convolutional layer-2, InstanceNorm-2, and ReLU-2. Each upsampling layer includes a deconvolutional layer (with a convolution kernel size of 2, a step of 2, and a padding of 0), two convolutional layers (with a convolution kernel size of 3, a step of 1, and a padding of 1), two InstanceNorm layers, and two ReLU activation functions, and is constructed in an order of the deconvolutional layer, convolutional layer-1, InstanceNorm-1, ReLU-1, convolutional layer-2, InstanceNorm-2, and ReLU-2. In order to enhance a feature extraction capability of the network for a medical image, a dense connection method is also adopted in the downsampling layer, and a residual module is added at a bottleneck to ensure that the segmentation model can extract sufficient information for segmentation. Finally, an output of the network passes through a Sigmoid activation function to limit a value range of the output to [0,1], which is considered as a predicted probability result of the target area.

When the DWI-UNet image segmentation model and the FLAIR-UNet image segmentation model are trained, DWI and FLAIR datasets of the acute ischemic lesion are first constructed. The original DWI and FLAIR images are selected and the abnormal data is removed. The lesion area is then manually annotated by an experienced neuroimaging expert, serving as the target area label for the corresponding image. Combined with the original imaging, this constitutes the image segmentation dataset.

Then, the corresponding image segmentation datasets are respectively applied to train the DWI-UNet image segmentation model and FLAIR-UNet image segmentation model, and a weighted binary cross entropy loss and a Dice loss are used during the training. A total loss of the training is a sum of the weighted binary cross entropy loss and the Dice loss, and calculation formulas of the weighted binary cross entropy loss and the Dice loss are as follows:

$$\mathcal{L}_{wce} = -\sum_i w * y_i \log(\hat{y}_i) + (1-y_i) * \log(1-\hat{y}_i);$$

$$\mathcal{L}_{dice} = 1 - \frac{2\sum_{i=1}^{N} y_i \hat{y}_i}{\sum_{i=1}^{N} y_i + \sum_{i=1}^{N} \hat{y}_i}.$$

In the above calculation formulas, w represents a weight parameter, i represents an ith pixel in an image, $y_i$ represents a true label value of the pixel, $\hat{y}_i$ represents a value predicted by the network for the pixel, and * represents a multiplication operation of a corresponding element.

Finally, the network is trained separately by using reverse gradient propagation and gradient descent algorithms until the network converges. Through cross validation, an average Dice value and an average Hausdorff distance value of model segmentation results are evaluated on a test set, and a model with a best evaluation index, namely, highest segmentation accuracy, is selected for parameter saving. Finally, a trained DWI-UNet image segmentation model and a trained FLAIR-UNet image segmentation model are obtained.

Step S4: Register the second image segmentation result onto the first image segmentation result to obtain a registered second image segmentation result.

The S4 specifically includes the following steps:

Step S41: Register the FLAIR image onto the DWI image to obtain an affine transformation matrix.

Step S42: Apply the affine transformation matrix to register the second image segmentation result onto the first image segmentation result.

Step S5: Apply a Dice metric to evaluate a degree of mismatch between the first image segmentation result and the registered second image segmentation result.

The method for evaluating a DWI-FLAIR mismatch provided in the present disclosure can be constructed as a DWI-FLAIR mismatch evaluation model. The following describes the DWI-FLAIR mismatch evaluation model in the present disclosure:

Firstly, a mismatch evaluation metric is constructed. For DWI and FLAIR images of a same user, it is considered that a mismatch occurs when a target area is not displayed on the FLAIR image but a target area is displayed on the DWI image. The Dice metric is a set similarity metric commonly used to calculate a similarity between two samples, with a value threshold of [0,1]. In the medical image, the Dice metric is often used for image segmentation, with a best result being 1 and a worst result being 0. A calculation formula of the Dice metric is as follows:

$$\text{dice}(A,B) = \frac{2|A \cap B|}{|A|+|B|}.$$

In the present disclosure, A and B respectively represent a DWI image segmentation result and a FLAIR image segmentation result. Therefore, after the segmentation results of the two types of images are obtained through a deep learning model, Dice values of the segmentation results can reflect a degree of matching between the target areas displayed on the DWI and FLAIR images. The target area is determined by the user as needed, for example, the target area may be an AIS lesion. 1-Dice reflects a degree of mismatch between the two segmented target areas, which is calculated according to a following formula, where $\text{Score}_{mismatch}$ represents a mismatch score:

$$\text{Score}_{mismatch}(A,B) = 1 - \text{dice}(A,B)$$

Figure 2:
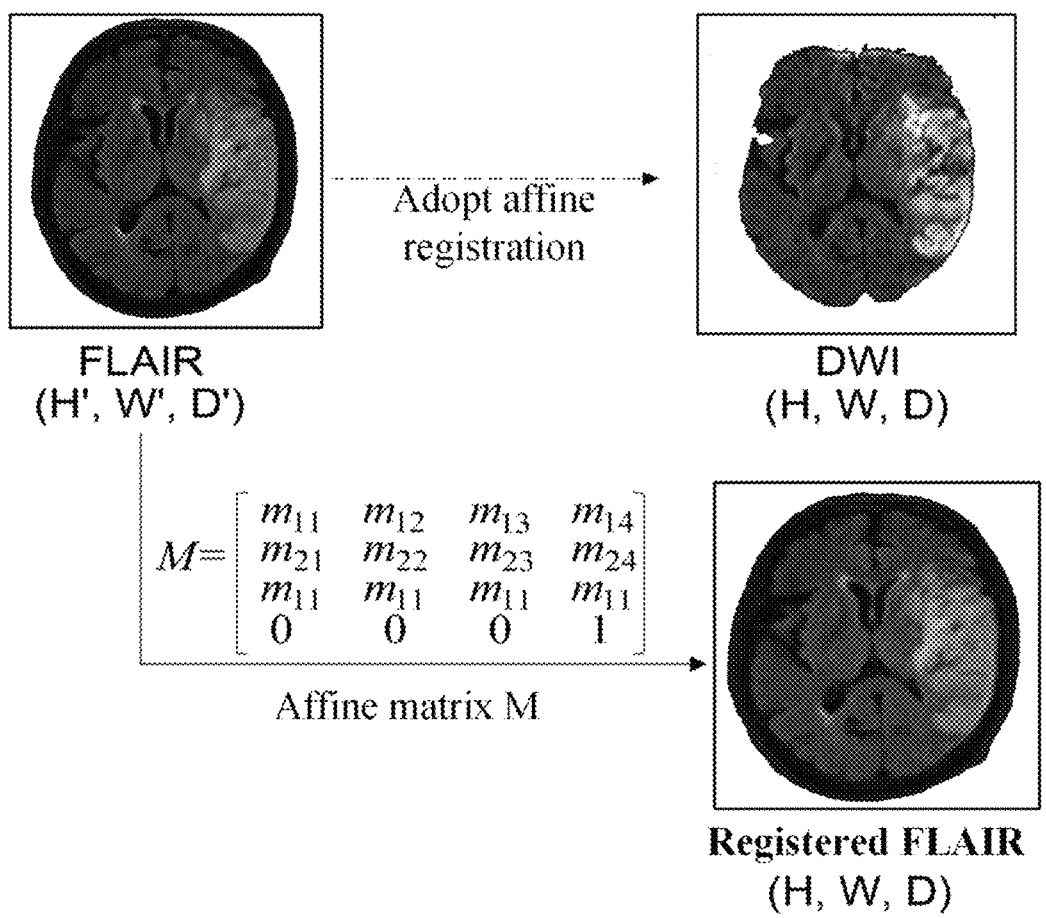
FIG. 2 schematically shows a process of registering a FLAIR image onto a DWI image through affine transformation according to Embodiment 1 of the present disclosure.

The above evaluation metric is applied to describe a specific evaluation process. Usually, the DWI and FLAIR images of the same user are not completely aligned, and it is not possible to perform mismatch evaluation and calculation directly using the segmentation results, because the segmentation results may correspond to different positions for same coordinates. Therefore, it is necessary to align same anatomical structures in the two images, and when the same anatomical structures are represented in coordinates, it is desirable that they are on same coordinates. As shown in FIG. 2, an FSL tool is first used to register the FLAIR image (with a width, a height, and a depth being H', W', and D' respectively) onto the DWI image (with a width, a height, and a depth being H, W, and D respectively). Affine Transformation with 12 degrees of freedom is adopted (A calculation method used is the affine transformation with 12 degrees of freedom, as there are three coordinate axes x, y, and z in Euclidean space, and each coordinate axis corresponds to four transformations: translation, rotation, scaling, and tilt, totaling 12 types of transformations, namely 12 degrees of freedom). However, there are various types of transformations, but they can be represented by an algebraic equation:

$$Y = X \cdot M, X, Y \in R^{4 \times 1}, M \in R^{4 \times 4}.$$

In the above equation, R represents a set of real numbers; X, Y represent augmented original and transformed images, with the first three elements representing an actual position in the Euclidean space and a last element being 1, used for scaling; and M represents a transformation matrix. With the help of the FSL tool, after the registration is completed, the affine transformation matrix M can be obtained, which has a form shown in FIG. 2. The affine transformation matrix describes matrix transformation required to register the FLAIR and DWI images, where $m_{ij}$ represents the 12 degrees of freedom mentioned above. Therefore, applying a same matrix transformation operation to the FLAIR-UNet segmentation result can achieve alignment with the DWI-UNet segmentation result.

Figure 3:
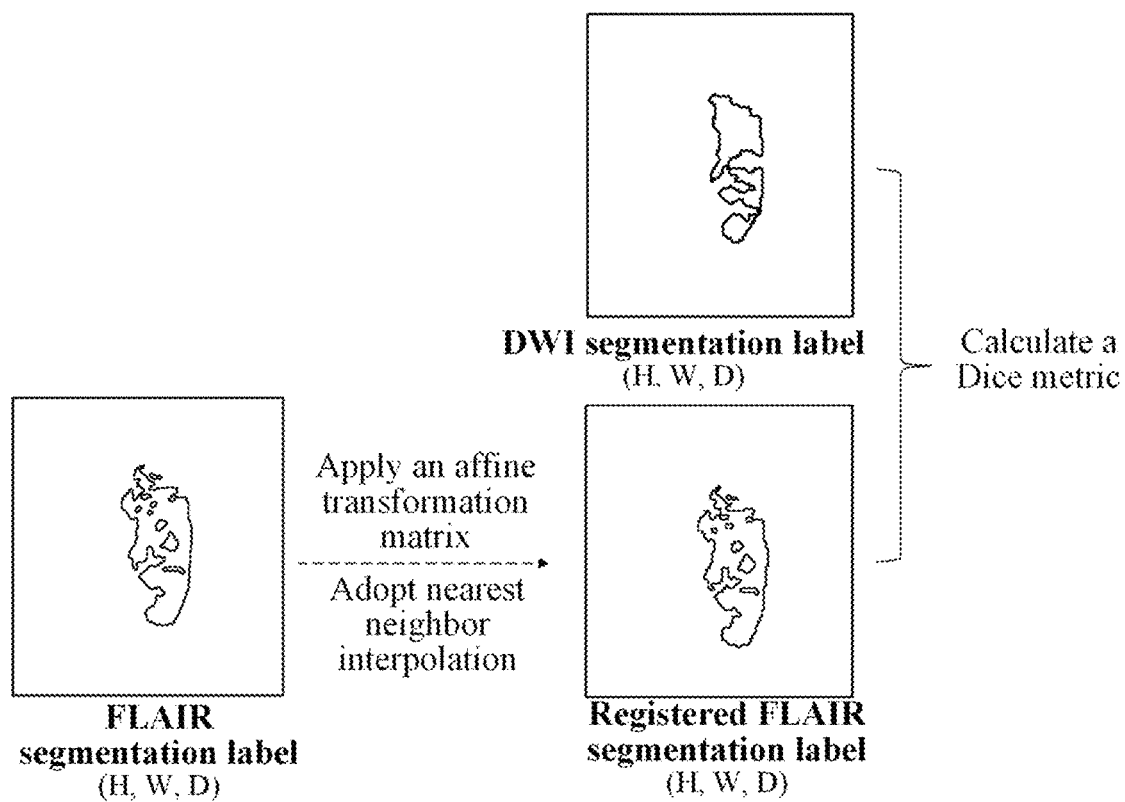
FIG. 3 schematically shows a process of applying a transformation matrix to align a segmentation result according to Embodiment 1 of the present disclosure.

As shown in FIG. 3, with the help of an apply function provided by the FSL tool, the obtained affine transformation matrix is applied to a result (with sizes of H', W', and D') obtained by a FLAIR image segmentation network, and transformation is performed through nearest neighbor interpolation to apply registration transformation to a result of a FLAIR target area to obtain a registered segmentation result (with sizes of H, W, and D), which aligns with the DWI image segmentation result (with sizes of H, W, and D). The two registered segmentation results are calculated according to a mismatch evaluation metric formula to obtain a final DWI-FLAIR mismatch score. If the score is greater than a threshold, it is considered that there is a DWI-FLAIR mismatch for a current user. In addition, according to research, a mismatch that an acute ischemic lesion visible in DWI but invisible FLAIR imaging indicates that stroke onset time of a patient is within 4.5 hours (≤4.5 hours since a symptom appears). The DWI-FLAIR mismatch can provide auxiliary information for the doctor to confirm the stroke onset time.

Figure 4:
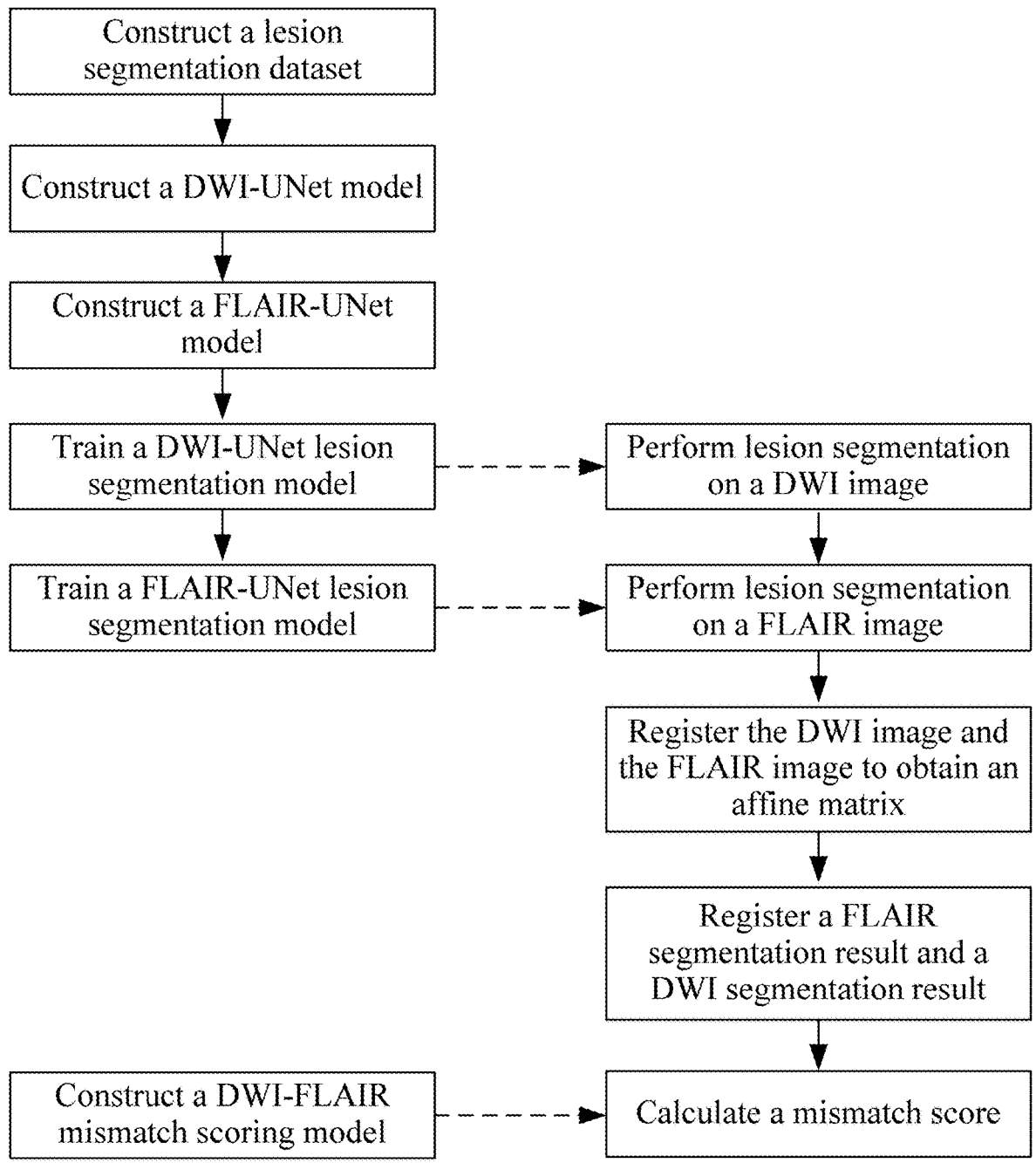
FIG. 4 is a flowchart of actually applying a method for evaluating a DWI-FLAIR mismatch based on a deep learning model according to Embodiment 1 of the present disclosure.

As shown in FIG. 4, a method for evaluating a DWI-FLAIR mismatch based on a deep learning model provided in the present disclosure includes the following steps:

Step 1: Train an image segmentation model.

A DWI-UNet image segmentation network and a FLAIR-UNet image segmentation network are separately trained by using a constructed segmentation dataset, to obtain two accurate image segmentation models.

Step 2: Construct a DWI-FLAIR mismatch evaluation model. A mismatch score of a target area is constructed based on a Dice metric.

Step 3: Segment a DWI image. The DWI image is segmented by using a trained DWI-UNet segmentation network.

Step 4: Segment a FLAIR image. The FLAIR image is segmented by using a trained FLAIR-UNet segmentation network.

Step 5: Register the FLAIR image and the DWI image. The FLAIR image and the DWI image are registered through affine transformation by using an FSL tool, to obtain an affine matrix followed by the transformation.

Step 6: Register a FLAIR segmentation result and a DWI segmentation result. The affine matrix obtained in the step 5 is applied to a FLAIR image segmentation result to obtain a FLAIR image segmentation result aligned with the DWI segmentation result.

Step 7: Calculate a mismatch score. A score of a mismatch between registered FLAIR and DWI segmentation results is calculated by using the constructed DWI-FLAIR mismatch evaluation model.

The Present Disclosure has the Following Advantages:

1. The present disclosure uses a DWI-FLAIR mismatch evaluation model based on a deep learning model to provide a doctor with a prompt for stroke onset time, achieving automated analysis of medical image data without a need for manual intervention by the doctor, improving work efficiency, and reducing a workload of the doctor. Image data of lots of users can be analyzed within a short period of time, accelerating stroke diagnosis and intervention.

2. The mismatch evaluation model of the present disclosure is based on deep learning and can accurately evaluate a degree of mismatch between DWI and FLAIR images. The prompt for the stroke onset time is provided, which helps the doctor determine a time window for treatment and enables the doctor better choose a treatment strategy.

3. By providing the prompt for the stroke onset time, the present disclosure is expected to have a positive clinical impact on a treatment outcome of a stroke patient, increase an opportunity of the stroke patient for timely intervention, and help improve survival and recovery rates of the stroke patient.

4. The present disclosure constructs the DWI-FLAIR mismatch evaluation model based on a deep learning model. The model can automate segmentation and evaluation, providing auxiliary information for the doctor to identify an AIS lesion.

5. The present disclosure constructs a DWI-FLAIR mismatch evaluation metric, namely a Dice metric. Calculation based on the Dice metric is used to quantify a matching degree of target areas on the DWI image and the FLAIR image.

6. The present disclosure utilizes a FSL tool to align a FLAIR image segmentation result and a DWI image segmentation result, realizing automated interpretative calculation of a DWI-FLAIR mismatch.

Embodiment 2

A computer apparatus includes a memory, a processor, and a computer program stored in the memory and executable on the processor. The processor executes the computer program to implement the steps of the method for evaluating a DWI-FLAIR mismatch in Embodiment 1.

Embodiment 3

A computer-readable storage medium stores a computer program. The computer program is executed by a processor to implement the steps of the method for evaluating a DWI-FLAIR mismatch in Embodiment 1.

Embodiment 4

A computer program product includes a computer program. The computer program is executed by a processor to implement the steps of the method for evaluating a DWI-FLAIR mismatch in Embodiment 1.

Embodiment 5

Figure 6:
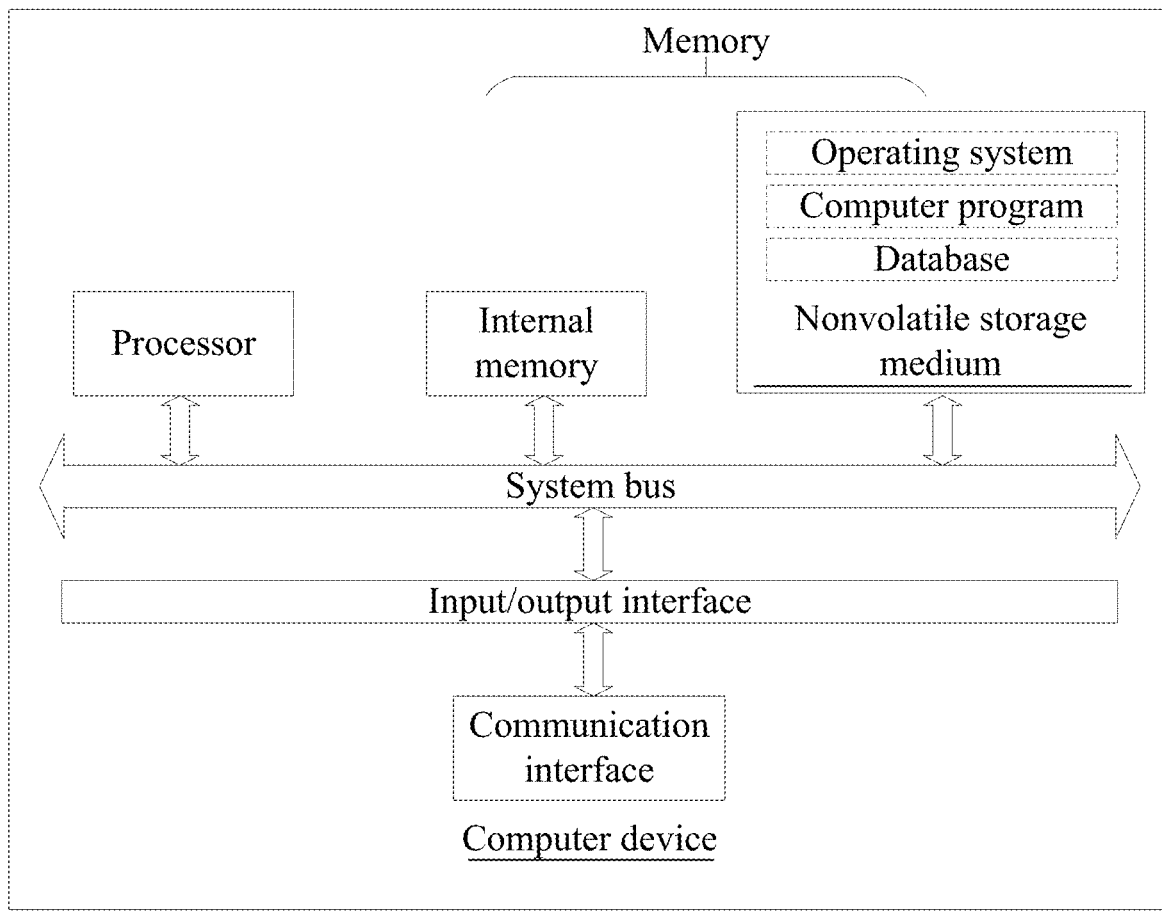
FIG. 6 is a diagram of an internal structure of a computer device.

A computer device is provided. The computer device may be a database and its internal structure may be shown in FIG. 6. The computer device includes a processor, a memory, an input/output (I/O) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a nonvolatile storage medium and an internal memory. The nonvolatile storage medium stores an operating system, a computer program, and a database. The internal memory provides an environment for running the operating system and the computer program in the nonvolatile storage medium. The database of the computer device is configured to store a pending transaction. The I/O interface of the computer device is configured to exchange information between the processor and an external device. The communication interface of the computer device is configured to connect to and communicate with an external terminal through a network. The computer program is executed by the computer program to implement the method for evaluating a DWI-FLAIR mismatch in Embodiment 1.

It should be noted that information of an object (including but not limited to device information of the object, personal information of the object, and the like) and data (including but not limited to data for analysis, data for storage, data for exhibition, and the like) in the present disclosure are information and data authorized by the object or fully authorized by each party, and relevant data shall be acquired, used, and processed according to laws, regulations, and standards of related countries and regions.

Those of ordinary skill in the art may understand that all or some of the procedures in the method of the foregoing embodiments may be implemented by a computer program instructing related hardware. The computer program may be stored in a nonvolatile computer-readable storage medium. When the computer program is executed, the procedures in the embodiments of the foregoing method may be performed. Any reference to the memory, the database, or other media used in the embodiments of the present disclosure may include at least one of a nonvolatile memory and a volatile memory. The nonvolatile memory may include a read-only memory (ROM), a magnetic tape, a floppy disk, a flash memory, an optical memory, a high-density embedded nonvolatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM), an external cache memory, or the like. As an illustration rather than a limitation, the RAM may be in various forms, such as a static random access memory (SRAM) or a dynamic random access memory (DRAM). The database in the embodiments of the present disclosure may include at least one of a relational database and a non-relational database. The non-relational database may include a blockchain-based distributed database, but is not limited thereto. The processor in the embodiments of the present disclosure may be a general processor, a central processing unit, a graphics processor, a digital signal processor, a programmable logic device, and a data processing logic device based on quantum computing, but is not limited thereto.

The technical features of the above embodiments can be employed in arbitrary combinations. For brevity of description, all possible combinations of all the technical features of the above embodiments may not be described; however, these combinations of the technical features should be construed as falling within the scope defined by the specification as long as no contradiction occurs.

Particular examples are used herein for illustration of principles and implementations of the present disclosure. The descriptions of the above embodiments are merely used for assisting in understanding the method of the present disclosure and its core ideas. In addition, those of ordinary skill in the art can make various modifications in terms of particular implementations and the scope of application in accordance with the ideas of the present disclosure. In conclusion, the content of the specification shall not be construed as limitations to the present disclosure.

What is claimed is:

1. A method for evaluating a diffusion weighted imaging (DWI)-fluid attenuated inversion recovery (FLAIR) mismatch, comprising:
   obtaining a DWI image and a FLAIR image of a target object;
   applying a first image segmentation model to segment the DWI image to obtain a first image segmentation result, wherein the first image segmentation model is obtained by training a neural network based on a U-Net framework by using a DWI image dataset of an acute ischemic lesion;
   applying a second image segmentation model to segment the FLAIR image to obtain a second image segmentation result, wherein the second image segmentation model is obtained by training the neural network based on the U-Net framework by using a FLAIR image dataset of the acute ischemic lesion;
   registering the second image segmentation result onto the first image segmentation result to obtain a registered second image segmentation result; and
   applying a Dice metric to evaluate a degree of mismatch between the first image segmentation result and the registered second image segmentation result; wherein
   the neural network based on the U-Net framework comprises four sequentially-connected downsampling layers, a residual module, four sequentially-connected upsampling layers, and a first activation function;
   the four sequentially-connected downsampling layers are connected to the residual module, the residual module is connected to the four sequentially-connected upsampling layers, and the four sequentially-connected upsampling layers are connected to the first activation function;
   the downsampling layer comprises a maximum pooling layer, a first convolutional layer, a first InstanceNorm layer, a second activation function, a second convolutional layer, a second InstanceNorm layer, and a third activation function that are sequentially connected, and sizes of convolution kernels of both the first convolutional layer and the second convolutional layer are 3;
   the upsampling layer comprises a deconvolutional layer, a third convolutional layer, a third InstanceNorm layer, a third activation function, a fourth convolutional layer, a fourth InstanceNorm layer, and a fourth activation function that are sequentially connected, and sizes of convolution kernels of both the third convolutional layer and the fourth convolutional layer are 3;
   the first image segmentation model is a DWI-UNet image segmentation model, and the second image segmentation model is a FLAIR-UNet image segmentation model;
   architectures of the DWI-UNet image segmentation model and the FLAIR-UNet image segmentation model are consistent, and the DWI-UNet image segmentation model and the FLAIR-UNet image segmentation model are constituted by four downsampling and upsampling stages, wherein each downsampling layer comprises a maximum pooling layer, two convolutional layers, two InstanceNorm layers, and two ReLU activation functions, and is constructed in an order of the maximum pooling layer, convolutional layer-1, InstanceNorm-1, ReLU-1, convolutional layer-2, InstanceNorm-2, and ReLU-2, and the convolutional layer of each downsampling layer has a convolution kernel of 3, a step of 1, and a padding of 1; each upsampling layer comprises a deconvolutional layer, two convolutional layers, two InstanceNorm layers, and two ReLU activation functions, and is constructed in an order of the deconvolutional layer, convolutional layer-1, InstanceNorm-1, ReLU-1, convolutional layer-2, InstanceNorm-2, and ReLU-2, the deconvolutional layer of each upsampling layer has a convolution kernel of 2, a step of 2, and a padding of 0, and the convolutional layer of each upsampling layer has a convolution kernel of 3, a step of 1, and a padding of 1; a dense connection method is adopted in the downsampling layer, and a residual module is added at a bottleneck; and outputs of the DWI-UNet image segmentation model and the FLAIR-UNet image segmentation model pass through a Sigmoid activation function to limit value ranges of the outputs to [0,1], wherein an output value is a probability result predicted for a target area;

when the DWI-UNet image segmentation model and the FLAIR-UNet image segmentation model are trained, DWI and FLAIR datasets of the acute ischemic lesion are first constructed, original DWI and FLAIR images are selected, and abnormal data is removed, such that a doctor manually delineates a lesion area as a target area of a corresponding image for labeling, and a labeled target area forms an image segmentation dataset with original image data; and then corresponding image segmentation datasets are applied to train the DWI-UNet image segmentation model and FLAIR-UNet image segmentation model respectively, and a weighted binary cross entropy loss and a Dice loss are used during the training, wherein a total loss function of the training is a sum of the weighted binary cross entropy loss and the Dice loss, and calculation formulas of the weighted binary cross entropy loss and the Dice loss are as follows:

$$\mathcal{L}_{wce} = -\sum_i w * y_i \log(\hat{y}_i) + (1 - y_i) * \log(1 - \hat{y}_i);$$

$$\mathcal{L}_{dice} = 1 - \frac{2 \sum_{i=1}^{N} y_i \hat{y}_i}{\sum_{i=1}^{N} y_i + \sum_{i=1}^{N} \hat{y}_i};$$

wherein w represents a weight parameter, i represents an $i^{th}$ pixel in an image, $y_i$ represents a true label value of the pixel, $\hat{y}_i$ represents a value predicted by the network for the pixel, * represents a multiplication operation of a corresponding element, and N represents a total quantity of pixels in the image; and finally the DWI-UNet image segmentation model and FLAIR-UNet image segmentation model are respectively trained by using reverse gradient propagation and gradient descent algorithms until the DWI-UNet image segmentation model and FLAIR-UNet image segmentation model converge; and an average Dice value and an average Hausdorff distance value of model segmentation results are evaluated on a test set through cross validation, a model with a best evaluation index, namely highest segmentation accuracy, is selected for parameter saving, and finally a trained DWI-UNet image segmentation model and a trained FLAIR-UNet image segmentation model are obtained.

2. The method for evaluating a DWI-FLAIR mismatch according to claim 1, wherein a process of constructing the DWI image dataset of the acute ischemic lesion specifically comprises:

obtaining the original DWI image of the acute ischemic lesion;

removing the abnormal data from the original DWI image to obtain a processed original DWI image; and labeling a target area in the processed original DWI image to obtain a labeled original diffusion-weighted image, and using the original diffusion-weighted image and the labeled original diffusion-weighted image as the diffusion-weighted image dataset of the acute ischemic lesion.

3. A computer apparatus, comprising a memory, a processor, and a computer program stored in the memory and executable on the processor, wherein the processor executes the computer program to implement steps of the method for evaluating a DWI-FLAIR mismatch according to claim 2.

4. A non-transitory computer-readable storage medium, wherein the computer-readable storage medium stores a computer program, and the computer program is executed by a processor to implement steps of the method for evaluating a DWI-FLAIR mismatch according to claim 2.

5. The method for evaluating a DWI-FLAIR mismatch according to claim 1, wherein a process of constructing the FLAIR image dataset of the acute ischemic lesion specifically comprises:

obtaining the original FLAIR image of the acute ischemic lesion;

removing the abnormal data from the original FLAIR image to obtain a processed original FLAIR image; and labeling a target area in the processed original FLAIR image to obtain a labeled original FLAIR image, and using the original FLAIR image and the labeled original FLAIR image as the FLAIR image dataset of the acute ischemic lesion.

6. A computer apparatus, comprising a memory, a processor, and a computer program stored in the memory and executable on the processor, wherein the processor executes the computer program to implement steps of the method for evaluating a DWI-FLAIR mismatch according to claim 5.

7. A non-transitory computer-readable storage medium, wherein the computer-readable storage medium stores a computer program, and the computer program is executed by a processor to implement steps of the method for evaluating a DWI-FLAIR mismatch according to claim 5.

8. The method for evaluating a DWI-FLAIR mismatch according to claim 1, wherein the registering the second image segmentation result onto the first image segmentation result to obtain a registered second image segmentation result specifically comprises:

registering the FLAIR image onto the DWI image to obtain an affine transformation matrix; and applying the affine transformation matrix to register the second image segmentation result onto the first image segmentation result.

9. A computer apparatus, comprising a memory, a processor, and a computer program stored in the memory and executable on the processor, wherein the processor executes the computer program to implement steps of the method for evaluating a DWI-FLAIR mismatch according to claim 8.

10. A non-transitory computer-readable storage medium, wherein the computer-readable storage medium stores a computer program, and the computer program is executed by a processor to implement steps of the method for evaluating a DWI-FLAIR mismatch according to claim 8.

11. A computer apparatus, comprising a memory, a processor, and a computer program stored in the memory and executable on the processor, wherein the processor executes the computer program to implement steps of the method for evaluating a DWI-FLAIR mismatch according to claim 1.

12. A non-transitory computer-readable storage medium, wherein the computer-readable storage medium stores a computer program, and the computer program is executed by a processor to implement steps of the method for evaluating a DWI-FLAIR mismatch according to claim 1.

* * * * *